United States Patent [19]

Yamagiwa

[11] Patent Number: 5,024,254
[45] Date of Patent: Jun. 18, 1991

[54] LIQUID SHUT-OFF VALVE
[75] Inventor: Tamio Yamagiwa, Tokyo, Japan
[73] Assignee: Hi-Sonic Co., Ltd., Tokyo, Japan
[21] Appl. No.: 453,029
[22] Filed: Dec. 27, 1989

Related U.S. Application Data

[63] Continuation of Ser. No. 344,088, Apr. 27, 1989, abandoned.
[51] Int. Cl.$^5$ .............................................. F16K 31/38
[52] U.S. Cl. .................................. 137/219; 137/550; 251/44
[58] Field of Search .................. 251/44; 137/509, 550, 137/220, 221, 219

[56] References Cited

U.S. PATENT DOCUMENTS

| | | | |
|---|---|---|---|
| 1,046,548 | 12/1912 | Bloom | 251/44 X |
| 1,281,566 | 10/1918 | Hedges | 251/44 X |
| 3,113,583 | 12/1963 | Fox | 251/44 X |
| 3,198,204 | 8/1965 | Parks | 251/44 X |
| 3,415,269 | 12/1968 | Salerno | 251/44 X |
| 3,792,716 | 2/1974 | Sime et al. | 137/220 X |
| 4,444,222 | 4/1984 | Yamagiwa | 137/393 |
| 4,522,226 | 6/1985 | Yamagiwa | 137/390 |

FOREIGN PATENT DOCUMENTS 903199 8/1962 United Kingdom .................. 251/44

Primary Examiner—John Rivell
Attorney, Agent, or Firm—Cushman, Darby & Cushman

[57] ABSTRACT

A liquid shut-off valve has a hollow cylindrical casing connected in a liquid pipe such as a water supply pipe, a hollow cylindrical valve seat member disposed in a downstream portion of the casing and having a valve seat opening, a guide member disposed in an upstream portion of the casing and having large openings for allowing main flow of the liquid to pass therethrough and a small opening for shunting a small-rate flow of the liquid serving as a signal liquid, and a hollow valve seat member slidable in the casing between an open position where it opens the valve seat opening and a close position where it closes the valve seat opening. The hollow valve member having pressure-receiving ends of different pressure receiving areas so that it is moved to the close position when a liquid pressure is established in a pressure chamber defined by the hollow valve member and the guide member. The liquid shut-off valve further has a second shut-off valve unit provided in a line which connects the pressure chamber to a downstream portion of the liquid pipe and is capable of selectively opening and closing the flow of the signal liquid flowing from the pressure chamber. When the second shut-off valve closes the flow of the signal liquid, a pressure is built-up in the pressure chamber so as to drive the hollow valve member to the close position thereby shutting off the main flow of the liquid.

1 Claim, 1 Drawing Sheet

LIQUID SHUT-OFF VALVE

This is a continuation of application Ser. No.07/344,088, filed Apr. 27, 1989, which was abandoned upon the filing hereof.

BACKGROUND OF THE INVENTION

1. Field of the Invention

The present invention relates to a liquid shut-off valve and, more particularly, to a liquid shut-off valve which is capable of shutting off a flow of a liquid with a small valve actuating power.

2. Description of the Related Art

Various types of liquid shut-off valve have been known such as a diaphragm-actuated liquid shut-off valve and a solenoid-actuated liquid shut-off valve.

In general, a diaphragm-actuated liquid shut-off valve has a diaphragm which separates two chambers from each other. A valve member extends from one side of the diaphragm through one of the two chambers for cooperation with a valve seat which is formed in a liquid pipe. The diaphram is biased by a spring towards the other of two chambers so as to keep the valve member away from the valve seat when no signal pressure is applied to the other of two chambers. However, when a signal pressure of a level high enough to produce a force capable of overcoming the force of the biasing spring is introduced into the other chamber, the diaphragm is deflected against the force of the biasing spring thereby bringing the valve member into engagement with the valve seat so as to close the liquid passage, thus shutting off the flow of the liquid.

On the other hand, a solenoid-actuated liquid shut-off valve is operated in accordance with an electrical signal, in contrast to the diaphragm-actuated liquid shut-off valve which operates in response to a pressure signal. Namely, a solenoid-actuated liquid shut-off valve in general has a solenoid coil and a movable core to which is fixed a valve member. When the solenoid is not actuated, the movable core is urged by a spring so as to keep the valve member in contact with the valve seat. However, when the solenoid is energized by an electrical signal current, an electromagnetic force is generated to attract the movable core against the force of the spring so that the valve member is moved away from the valve seat thereby opening the liquid passage.

Both the diaphragm-actuated and solenoid-actuated liquid shut-off valves require a large actuating power, i.e., a high pressure or a large electrical current, in order to produce a large force which overcomes the force of the biasing spring which biases the diaphragm or the movable core.

SUMMARY OF THE INVENTION

Accordingly, an object of the present invention is to provide a liquid shut-off valve which is capable of shutting off a flow of a liquid with a small valve actuated power.

To this end, according to the present invention, there is provided a liquid shut-off valve comprising: a first shut-off valve unit which includes a hollow cylindrical casing provided at its one end with a liquid inlet and at its other end with a liquid outlet, a hollow valve seat member disposed in the fluid passage in the casing adjacent to the fluid outlet and having a valve seat opening for allowing a liquid to pass therethrough, a guide member disposed in the liquid passage in the casing adjacent to the liquid inlet and having a guide portion, an opening for allowing the liquid to pass therethrough at a large flow rate and a small hole for allowing the liquid as a signal liquid to flow therethrough at a small flow rate, and a hollow valve member slidable along the hollow valve seat member and the guide portion of the guide member so as to selectively open and close the valve seat opening; a communication pipe providing a communication between a pressure chamber which is defined by the hollow valve member and the guide portion and communicating with the small hole and a portion of the liquid passage downstream of the hollow valve seat member, and a second shut-off valve unit capable of selectively relieving the liquid from the pressure chamber.

The above and other objects, features and advantages of the present invention will become clear from the following description of the preferred embodiment when the same is read in conjunction with the accompanying drawings.

DESCRIPTION OF THE PREFERRED EMBODIMENT

Figure 1:
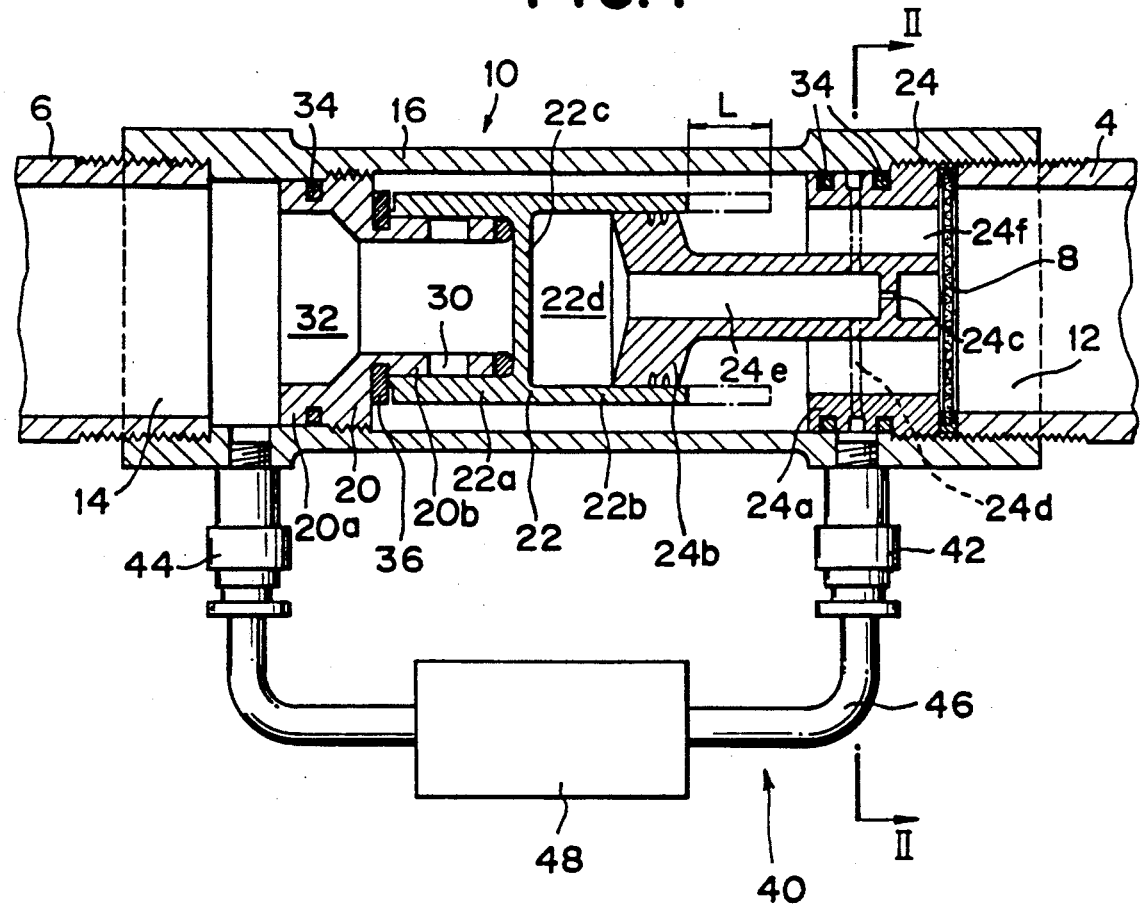
FIG. 1 is a fragmentary sectional view of a preferred embodiment of a liquid shut-off valve in accordance with the present invention.
Figure 2:
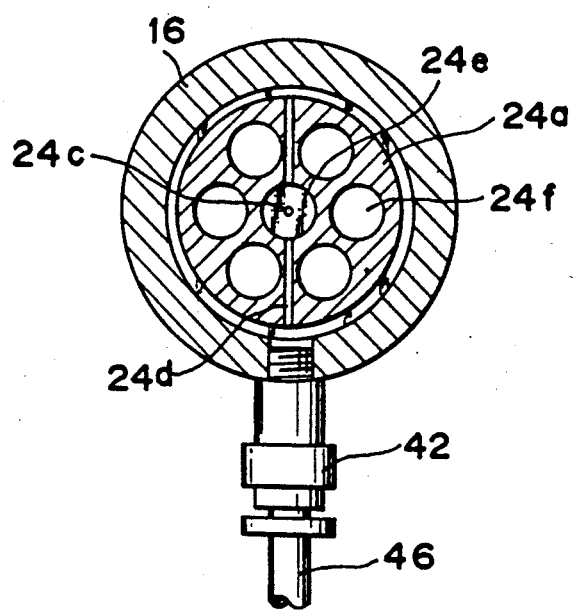
FIG. 2 is a sectional view taken along the line II—II of FIG. 1.

A preferred embodiment of the invention will be described hereinafter with reference to the accompanying drawings.

The construction of the whole of the liquid shut-off valve embodying the present invention will be described. The liquid shut-off valve has a first shut-off valve unit 10 connected between an upstream pipe section 4 and a downstream pipe section 6, with a filter 8 disposed between the upstream pipe section 4 and the first shut-off valve unit 10. The first shut-off valve unit 10 has an inlet 12 and an outlet 14. A by-pass line 40 is connected between the inlet 12 and the outlet 14 so as to by-pass the first shut-off valve unit 10. A small valve, referred to as a second shut-off valve unit and denoted by 48, is disposed in the by-pass line 40, for the purpose of controlling the state of the first shut-off valve unit 10.

Referring now to the first shut-off valve unit 10, this unit 10 has a hollow substantially cylindrical casing with both ends defining the above-mentioned inlet 12 and outlet 14. The inlet 12 is connected to the upstream pipe section 4 through the aforementioned filter 8 which is composed of a screen mesh capable of preventing any foreign matter from flowing into the first shut-off valve unit 10. The outlet 14 of the casing 16 is connected to the downstream pipe section 6.

The first shut-off valve unit 10 has a hollow valve seat member 20 which fits in a downstream portion of a liquid passage 34 formed in the casing 16, i.e., adjacent to the outlet 14, through an intermediary of an "0" ring serving as a sealing member. The hollow valve seat member 20 has a large-diameter base portion 20a which fits in the casing 16, and a projecting portion 20b of a reduced diamter. The projecting portion 20b has an opening 30. The projecting portion 20b slidably guides a later-mentioned hollow valve member 22 and serves as a valve seat which cooperates with the hollow valve member 22.

The first shut-off valve unit 10 further has a guide member 24 which fits in an upstream portion of the passage 32 in the casing 16, i.e., adjacent to the inlet 12, through sealing "O"rings 34. The guide member 24 has a base portion 24a fitting in the casing 16 and a guide portion 24b which projects inward from the base portion 24a. The valve member 22 slidably and hermetically fits on the guide portion 24b. The base portion 24a has a plurality of circuit openings 24f which are equispaced in the circumferential direction. These circular openings 24f allow a liquid from the inlet 12 to flow therethrough. The base portion 24a also has a small central axial hole 24c for allowing a portion of the liquid from the inlet 12 to pass therethrough. The small axial hole 24c communicates with a bore 24e formed in the guide portion 24b. The bore 24e communicates with the inlet of the by-pass line 40, through radial small holes formed in the base portion 24a and an annular groove.

The hollow valve member 22 has a substantially cylindrical form with a partition wall 22c provided substantially at the center thereof so as to provide a left half part 22a and a right half part 22b as viewed in FIG. 1 with the left half-part 22a being depicted as being positioned downstream of the right half-part 22b. The left half-part 22a has a greater wall thickness than the right half-part 22b so as to provide a greater axial end surface area than the right half part 22b. The hollow valve member 22 is slidable over a stroke L, between a left stroke end position where it closes an opening 30 formed in the hollow valve seat member 20 and a right stroke end position where, as shown by one-dot-and-dash line, it opens the openings 30 formed in the hollow valve seat membver 20. An "O" ring 36 fitting in a groove formed in the outer peripheral surface of the hollow valve seat member 20 seals the left half part 22a of the hollow valve member 22 when the latter has been moved to left, thereby keeping the left half part away from the water.

The right half part 22b of the hollow valve member 22 slidably fits on the guide portion 24b of the guide member 24 so that a pressure chamber 22d communicating with a passage 24e is defined by the right half part 22b of the hollow valve member 22, partition wall 22c and the guide portion 24b.

When a later-mentioned second shut-off valve unit 48 disposed in the bypass line 40 is closed, the liquid is confined in the pressure chamber 22d so that the pressure of the liquid acts on the partition wall 22c so as to push the same to the left.

On the other hand, when the second shut-off valve unit 48 is opened, the liquid in the preferred chamber 22d discharged through the by-pass line 40, so that no pressure acts in the pressure chamber 22d. In this state, since the pressure receiving area of the left half part 22a of the hollow valve member 22 is greater than that of the right half part 22b of the same, the hollow valve member 22 is moved to the right due to the difference of force produced by the pressure of the liquid introduced from the inlet 12 and is held at the right stroke end as shown by one-dot-and-dash line. In this state, the opening 30 of the hollow valve member 20 communicates with the inlet 12 so that the liquid supplied from the upstream pipe section 4 is allowed to flow to the outlet 14 via the opening 24f in the guide member 24, passage defined by the inner wall of the casing 16, opening 30 and the passage 32.

A description will now given of the by-pass line 40. The by-pass line 40 includes a communication pipe 46 which provides a communication between the inlet, more practically the small radial holes 24d in the guide member 24, and the outlet 14, joint members 42 and 44 for securing the upstream and downstream ends of the communication pipe 46 to the casing 16, and the second shut-off valve unit 48 provided in the communication pipe 46. The second shut-off valve unit 48 may be of any desired type provided that it can shut-off the flow of the liquid such as water flowing through the communication pipe 46. Preferably, however, a solenoid valve or a motor-driven valve operated in accordance with an external electrical signal is used as the second shut-off valve unit 48. It is to be noted here that the solenoid valve or electrically driven valve used as the second shut-off valve has a capacity which is much smaller than the solenoid-actuated shut-off valve mentioned in the description of the related art. Namely, the solenoid-actuated liquid shut-off valve described in the related art statement is disposed in the liquid pipe so as to directly shut-off the flow of the liquid flowing in the pipe, so that it is essentially large in size and requires a large valve actuating power. In contrast, the solenoid valve or the electrically driven valve used as the second shut-off valve unit in the liquid shut-off valve of the present invention may be a small-sized valve which is operable with a small power, because it is required only to selectively shut-off the flow of the liquid serving as a signal liquid shunting from the main flow of the liquid, the flow rate of the shunting signal liquid is as small as 1/10 of the flow of the liquid in the liquid pipe.

In operation, when the liquid is continuously supplied through the liquid pipe, the second shut-off valve unit 48 in the by-pass line 40 is kept opened so that the liquid introduced into the by-pass line 40 through the small hole 24c in the guide member 24 from the inlet 12 is allowed to flow towards the outlet 14 so that no pressure is built up in the pressure chamber 22d. In consequence, as explained before, the hollow valve member moved to the right stroke end and held at this position as indicated by one-dot-and-dash line, due to the difference in the pressure receiving area. As a result, the water is allowed to flow from the inlet 12 to the outlet 14 via the passage defined by the inner surface of the casing 16 and the opening 30 in the hollow valve member 20.

When an electrical signal is supplied to the second shut-off valve 48 of the by-pass line 40, the second shut-off valve unit 48 is closed so that the flow of the liquid in the by-pass line 40 is shut-off, with the result that a pressure is built-up in the pressure chamber 22d. In consequence, the hollow valve member is moved from the right to the left to the position of the solid line, so that the opening 30 in the hollow valve member 20 is closed, whereby the flow of the liquid flowing in the liquid pipe is shut-off.

As has been described, the liquid shut-off valve of the present invention has a first shut-off valve unit disposed in a liquid pipe and capable of shutting off the flow of a liquid flowing in the liquid pipe, and a small-sized second shut-off valve unit which is disposed in a by-pass line so as to selectively shut off the signal liquid which shuts from the liquid pipe and which flows at a small flow rate so as to selectively built up or relieve a liquid pressure by which the first shut-off valve unit is actuated. It is therefore possible to shut-off the flow of a liquid with a small valve actuating power.

What is claimed is:

1. A liquid shut-off valve comprising:

a first shut-off valve unit which includes
  a hollow cylindrical casing providing a liquid passage having at its one end a liquid inlet and at its other end a liquid outlet,
a hollow valve seat member disposed in the liquid passage in the casing adjacent to the liquid outlet and having a valve seat opening for allowing a liquid to pass therethrough,
a guide member disposed in the liquid passage in the casing adjacent to the liquid inlet and having a guide portion, an opening for allowing the liquid to pass therethrough at a given flow rate and a small hole, smaller than the opening, for allowing the liquid as a signal liquid to flow therethrough at a flow rate smaller the given flow rate, and
a hollow valve member slidable along the hollow valve seat member and guide portion of the guide member for defining a pressure chamber between the hollow valve member and the guide portion and communicating with the small hole whereby the signal liquid flows into the pressure chamber, the hollow valve member including means operating free of any mechanical biasing forces for selectively opening and closing the valve seat opening;
a communication pipe providing a communication between the pressure chamber and a portion of the liquid passage downstream of the hollow valve seat member; and
shut-off valve means for selectively relieving the signal liquid from the pressure chamber;
the hollow valve member further including a partition wall substantially dividing the hollow valve member into upstream and downstream parts with the upstream and downstream part being constructed so as to include axial end surfaces with the axial end surface of the downstream part being larger than the axial end surface of the upstream part whereby the hollow valve member is capable of movement, free of any mechanical biasing forces, between a position in which the axial end surface of the upstream part abuts the guide portion and a position in which the axial end surface of the downstream part abuts the hollow valve seat member by selectively relieving the signal liquid from the pressure chamber.

* * * * *